Oct. 22, 1968

C. E. HURLBURT 3,406,575

GYRO BEARING FRICTION MINIMIZING MEANS

Filed March 3, 1966

INVENTOR.
Charles E. Hurlburt
BY
Constantine A. Michalos
ATTORNEY

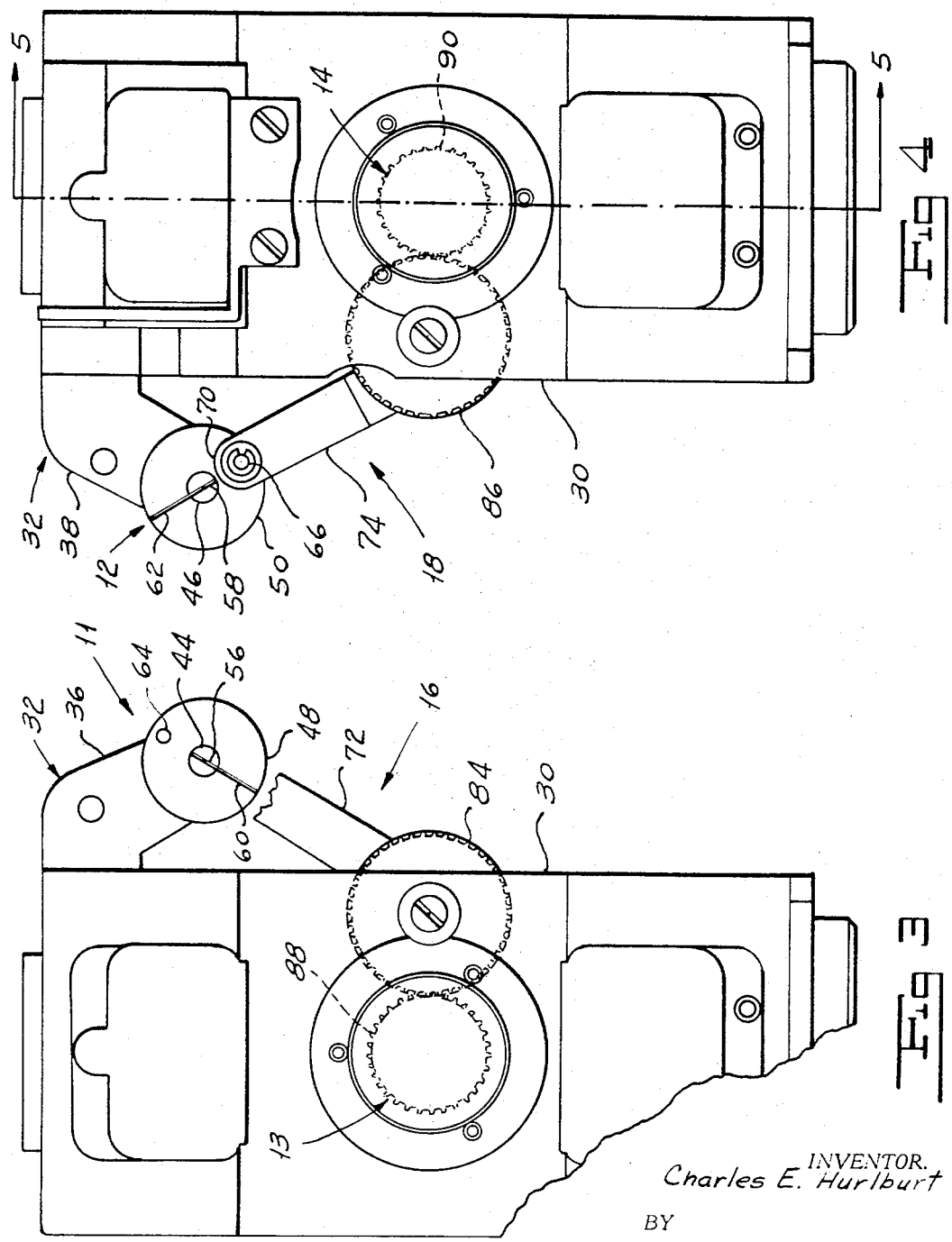

Oct. 22, 1968  C. E. HURLBURT  3,406,575
GYRO BEARING FRICTION MINIMIZING MEANS
Filed March 3, 1966  4 Sheets-Sheet 4

INVENTOR.
Charles E. Hurlburt
BY
Constantine A. Michalos
ATTORNEY

United States Patent Office 3,406,575
Patented Oct. 22, 1968

3,406,575
GYRO BEARING FRICTION MINIMIZING MEANS
Charles E. Hurlburt, River Edge, N.J., assignor to The Bendix Corporation, a corporation of Delaware
Filed Mar. 3, 1966, Ser. No. 531,390
12 Claims. (Cl. 74—5.5)

ABSTRACT OF THE DISCLOSURE

A gyro bearing friction minimizing means for a gyroscope having a pair of opposed bearings supporting a gyro gimbal, together with oscillating intermediate races in each of said opposed bearings, and means operatively connecting a continuously rotating actuating means to the intermediate races of the opposed bearings so as to produce a reverse bicyclic effect for oscillating said intermediate races of said pair of opposed bearings in opposite directions to each other at an equal displacement over an angular range of less than 180 degrees and more than 90 degrees and at an equal period of oscillation.

---

This invention relates generally to gyro bearing friction minimizing means and more particularly to a means of counter actuating the intermediate races of a pair of opposed gyro supporting dual bearings, wherein the intermediate race of each bearing is oscillated equally through a displacement of less than 180 degrees while being maintained precisely at 180 degrees out of phase with each other.

The problem of friction on the sensitive or horizontal gimbal axis of a directional gyro or on the output axis of a single degree of freedom gyro has long been a limitation upon minimizing the gyro drift. In addition, as is well known in the art, the starting or breakaway torque of a gimbal bearing of a gyroscope is the restraining torque that must be overcome to start rotation of a bearing. The value of this breakaway torque is somewhere between the actual running torque and twice the running torque for a bearing. This is the torque that contributes greatly to the drift of a normal directional gyroscope. If a condition exists which causes a torque to be put into a system which is supposed to correct the torque, the original system does not function as it was designed to do. Therefore a method and means to minimize this torque is highly desirable.

Heretofore, among the approaches for solving these problems have been to eliminate or reduce the friction by floating the gyroscopic element in a gas or liquid or by the concept of cancelling the friction torques. Many variations of putting one bearing inside of another have been tried. One type of bearing presently being marketed accomplishes this, interface of the two bearings, by means of an intermediate race. The improvement in performance by such a device is, to a large extent, dependent upon what is done with the intermediate race.

In some cases this intermediate race has been vibrated or dithered. In some cases the intermediate races of the two bearings, comprising a gimbal trunnion, have been alternately rotated in opposite directions. That is, for a certain period of time and for a number of revolutions, the intermediate race was rotated in one direction and then periodically this rotation of the intermediate race has been reversed.

Under any condition, the attempt is to reduce the friction by converting any static friction to a condition of rolling or kinetic friction. In this manner the torque on the given gimbal axis introduced by the rolling friction of one bearing will be counteracted by the torque introduced by the rolling friction of the other bearing.

Therefore an object of this invention is to provide means for the cancellation of friction within the bearing by providing that each individual bearing has the exact same time actuation in one direction as in the other direction, and the exact same travel or displacement in opposite directions.

Another object of this invention is to provide means for angularly oscillating the intermediate races of a pair of dual bearings, the oscillation being equal in time and rate in opposite directions of the intermediate race of one bearing in relation to the other bearing for perfect cancellation of frictional torques within the bearings.

A further object of this invention is to provide means for cancelling the frictional torque within a pair of opposed dual bearings by providing a device to cause each intermediate race of each dual race bearing to oscillate through a rotational distance which is less than 180 degrees and more than 90 degrees.

Still a further object of this invention is to provide a device for continuously oscillating an intermediate race of a pair of opposed dual race bearings supporting a gyro wherein the intermediate race of each opposed bearing oscillates less than 180 degrees while being maintained 180 degrees out of phase of each other.

An additional object of this invention is to provide means for assuring exact cancellation of friction of a dual bearing by utilizing exact equal displacement with exact equal time by means of oscillating the intermediate race of the dual bearing rather than by having multiple revolutions reversed at equal intervals of either time or displacement but not necessarily of both.

These and other objects and features of the invention are pointed out in the following description in the terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 3 is an end view of a gyro casing embodying the friction minimizing means shown in FIGURE 2;

FIGURE 4 is an opposite end view of the gyro casing of FIGURE 3 embodying the friction minimizing means shown in FIGURE 2;

Figure 1:
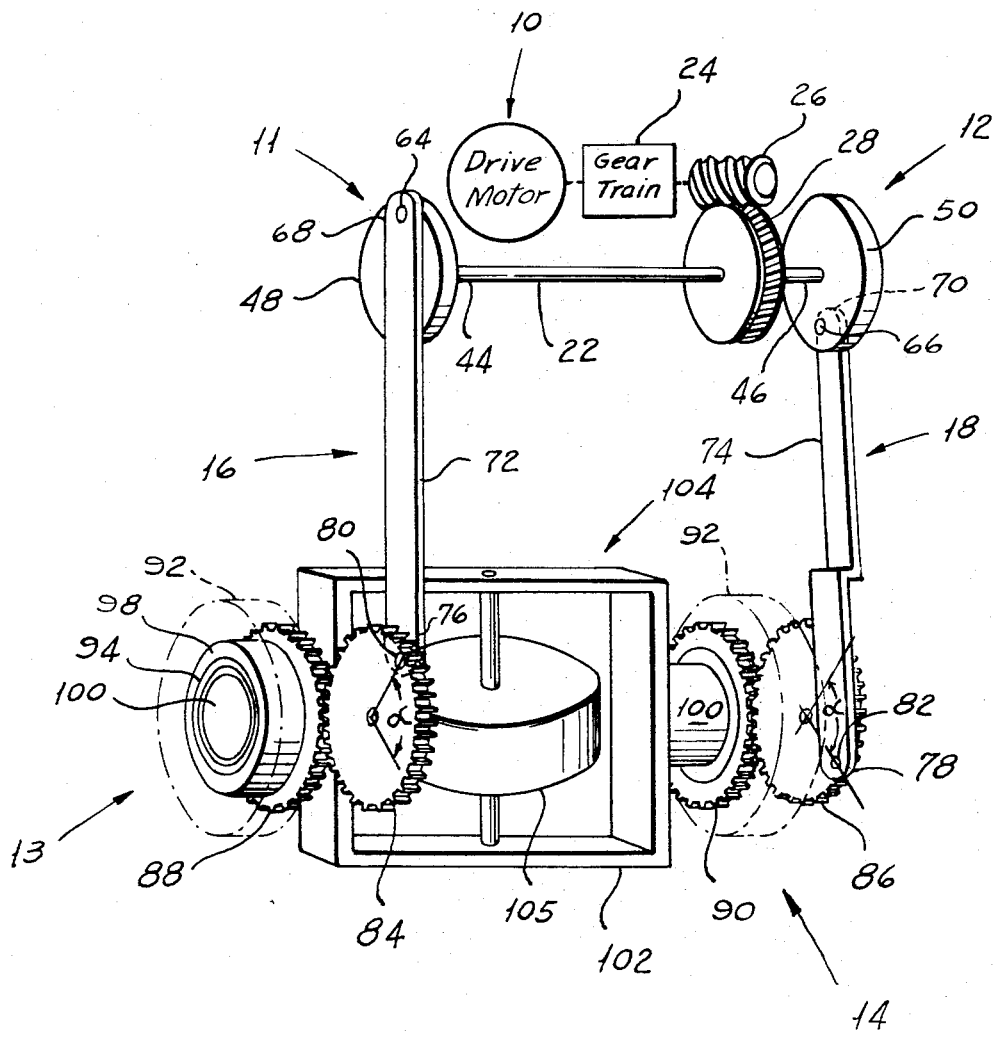
FIGURE 1 is an elevational schematic view showing a gyro bearing friction minimizing means embodying the invention.

Referring to the drawing of FIGURE 1 in detail, the embodiment of this invention includes a motor 10 driving, in one direction of rotation, a pair of actuating means 11 and 12 which in turn oscillate a pair of journaled mechanism means 13 and 14 through a pair of driving arm assemblies or linkage assemblies 16 and 18 respectively.

In such an arrangement, the motor 10 drives a jack shaft 22 through a gear reduction train 24 which in turn is connected to a worm gear 26 which meshes with a pinion gear 28 which is coaxially attached to the jack shaft 22.

Figure 2:
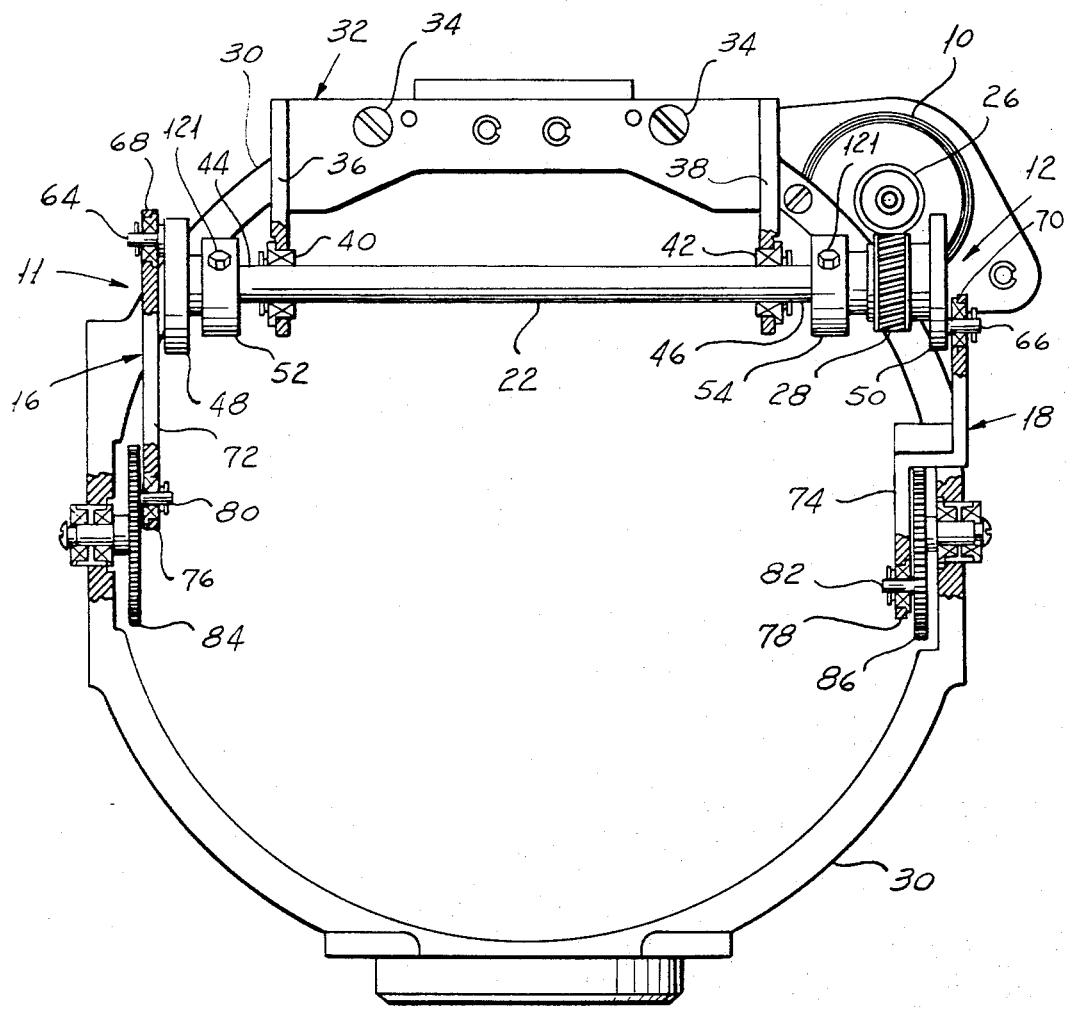
FIGURE 2 is a detailed end view of the friction minimizing means shown in the embodiment of FIGURE 1.

As best shown in FIGURE 2, the motor 10 is supported on a gimbal frame 30. The gimbal frame 30 also supports the jack shaft 22 through a bracket 32 secured to the frame 30 through screws 34. The bracket 32 comprises a pair of arms 36 and 38 having bearings 40 and 42 in which the shaft 22 is mounted and which permits rotation of said shaft when driven by the motor 10.

The shaft 22 supports, at each end portion 44 and 46, the actuating means 11 and 12, as shown by FIGURES 2, 3 and 4. The actuating means 11 and 12 include offset pivot wheels 48 and 50 which are coaxially secured to the shaft 22 by means of a pair of adjustable clamp collars 52 and 54.

The adjustable clamp collars 52 and 54 also provide means for calibrating, adjusting, or lining up indexing marks 56 and 58 inscribed on the ends 44 and 46 of the jack shaft 22, as best shown in FIGURES 3 and 4, with indexing marks 60 and 62 inscribed on the face of the pivot wheels 48 and 50 which provide a novel indexing means for facilitating the determination of the relative phase between the two linkage assemblies 16 and 18 as described and claimed in a copending U.S. application Ser. No. 531,577 filed Mar. 3, 1966 by Anthony E. Scotti, and assigned to The Bendix Corporation, assignee of the present invention. Such novel indexing means is not the subject matter of the present invention and no claim is made thereto herein.

The offset pivot wheels 48 and 50 include pivot pins 64 and 66 which can be adjusted to be exactly 180 degrees out of phase with each other, as can be best seen in FIGURES 1, 3 and 4. At the end portions 44 and 46 of the shaft 22, the pivot pins 64 and 66 which are integral to wheels 48 and 50, respectively, pivotally support, at ends 68 and 70, linkage arms 72 and 74 of the linkage assemblies 16 and 18, respectively. Connecting the linkage arms 72 and 74 at their other ends 76 and 78 is a pair of pins 80 and 82 of oscillating pivot gears 84 and 86 respectively.

The pivot pins 80 and 82 are located on the pivot gears 84 and 86 so that the pivot pins 80 and 82 can travel at exactly equal angles $\alpha$ for 180 degrees of rotation of wheels 48 and 50. The pivot pins 80 and 82 are so arranged as to oscillate an angle of $\alpha$, which is less than 180 degrees, as shown by FIGURE 1.

Thus, when pin 64 of the continuous rotating offset pivot wheel 48 is at the end of a cycle of operation of 360 degrees of rotation, the pin 66 of the continuous oscillating pivot wheel 50 will be 180 degrees of rotation out of phase with the pin 64 which will be at the middle of its cycle of operation of 360 degrees of rotation. Since pivot gears 84 and 86 are connected by the linkage arms 72 and 74 through the wheels 48 and 50, the pin 80 of the oscillating gear 84 will be at the end of its cycle of operation of $2\alpha$ degrees of oscillation, while the pin 82 of the oscillating gear 86 will be $\alpha$ degrees of oscillation out of phase with the pin 80. Thus the pin 82 will be at the middle of its cycle of operation and $\alpha$ degrees from the pin 80.

Each of the pivot gears 84 and 86 are connected to the oscillating journaled mechanism 13 and 14 by a gear 88 meshing with the pivot gear 84 and by a gear 90 meshing with the pivot gear 86, respectively.

Figure 5:
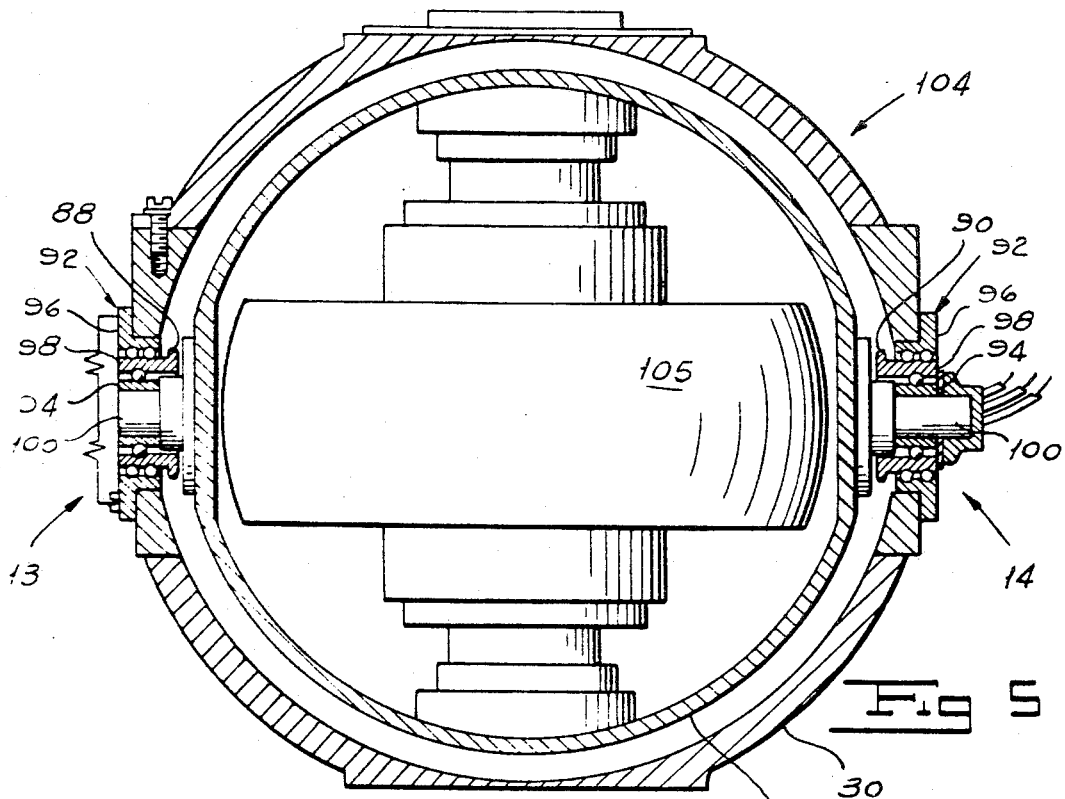
FIGURE 5 is a sectional view of the device shown in FIGURE 2 taken substantially along line 5—5 of FIGURE 4; and, FIGURE 6 is an enlarged detailed sectional view of a fragmentary portion of one of the pair of duel oscillating bearings embodied in the device shown in FIGURE 5.
Figure 6:
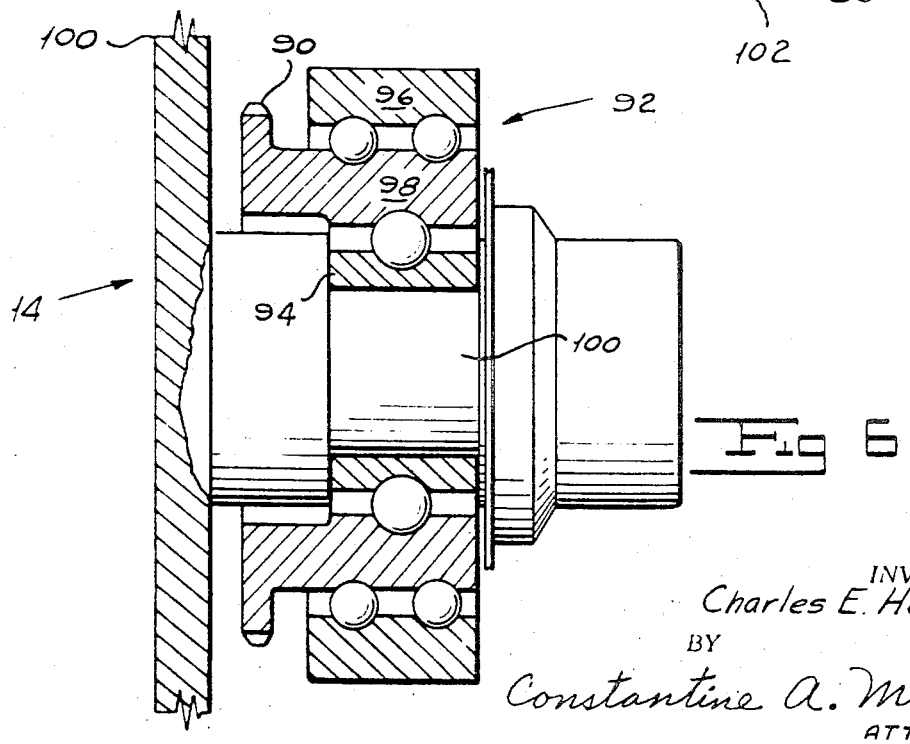

As shown in more detail in FIGURE 6, each journaled mechanism includes a bearing 92 having an inner race 94, an outer race 96, and an intermediate race 98. Each gear 88 and 90 is connected to one intermediate race such as intermediate race 98 of each bearing 92 which forms the horizontal trunnion on an output axis of an inner gimbal shaft 100, shown in FIGURES 1 and 5, of an inner gimbal 102 of a single degree of freedom gyro 104 having a gyro rotor 105 rotatably mounted in the gimbal 102 and rotatably driven therein by suitable motor means of conventional type.

Thus, the jack shaft 22 serves to drive through gears 84 and 86, the gears 88 and 90, and thereby the intermediate races 98 of the bearings 92 for the inner gimbal shaft 100. That is, the mechanical system just described oscillates the intermediate races 98 which are connected to the gears 88 and 90 so as to provide an equal angle of oscillation thereof of less than 180 degrees. The bearing oscillating action comes to a complete stop and then reverses the direction of oscillation of the bearings at both sides of the axis of the shaft 100 and at precisely the same time so as to cancel the starting torque at both sides of the shaft 100 at the same moment.

The linkages 72 and 74 are so connected that while the pins 64 and 66 rotate continuously in one direction, the pivot pins 80 and 82 are so arranged as to cause the intermediate race 98 of each bearing to oscillate opposite in phase to each other through equal angles of not more than 180 degrees and not less than 90 degrees. The ratio of the gears 84 and 88 and gears 86 and 90 are so selected that the angle of oscillation of the intermediate race 98 will be between the critical range of less than 180 degrees and more than 90 degrees or optimum range of, for example, 107 degrees. Further to effect the foregoing, the radius of rotation of the pins 80 and 82 is arranged so as to be greater than the radius of rotation of the pins 64 and 66 so that the intermediate race 98 may be oscillated through the aforenoted critical angle range by the hereinbefore mentioned mechanism.

It has been found that the optimum angle of oscillation of the intermediate race 98 is 107 degrees. If the angle of oscillation of the intermediate race 98 approaches the angle of 180 degrees, a "hang-up" type of operation would tend to result. That is, the intermediate race 98 driven through the linkages would be at a point where it would be indetermined as to which direction it would oscillate. On the other hand, if the angle of oscillation of the race 98 is reduced below an angle of 90 degrees, there would be a sharp reversal of the oscillation which would tend to add undesirable shock forces to the system.

In this manner when the intermediate race of one bearing introduces some small rolling friction into the gimbal axis in one direction, the intermediate race of the opposite bearing introduces an equal and completely opposite rolling friction into the gimbal axis in the other direction to thereby cancel the friction introduced by the first bearing. By this method it is assured that exact cancellation of the friction can be achieved by exact equal displacement and by exact equal timing which is more effectively obtained than by having a multiple revolution of the intermediate race of the bearing.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a gyro bearing friction minimizing means in combination with a gyroscope having a pair of opposed bearings supporting a gyro gimbal, each of said bearings including an intermediate race, the improvement comprising oscillating journaled mechanism means connecting each intermediate race of each opposed bearing in opposite sense to said oscillating means, rotatable actuating means continuously rotating in one direction, means connecting said rotatable actuating means to said journaled mechanism means, said connecting means for continuously acting upon said journaled mechanism means so as to produce a reverse bicyclic effect for oscillating said intermediate races of said pair of opposed bearings in opposite directions to each other, said journaled mechanism means thereby oscillating each of the intermediate races at an equal displacement over an angular range of less than 180 degrees at an equal period of oscillation, thereby converting the static friction of said bearings to kinetic friction and thus limiting the friction within said bearings equally in both directions.

2. The combination defined by claim 1 further comprising said connecting means including linkage assembly means interposed between said oscillating journaled mechanism means and said rotatable actuating means, said actuating means including first pivotal connecting means for connecting said linkage assembly means at a predetermined offset distance from a center of rotation of said rotatable actuating means, and said oscillating journaled mechanism means including second pivotal connecting means connecting said linkage assembly means at an offset distance from a center of oscillation of said oscillating journaled mechanism means which is greater than the predetermined offset distance of said first connecting means for producing a continuous oscillating motion at exact and equal displacement and at an equal period of oscillation as said actuating means is continuously rotated in one direction.

3. The combination defined by claim 1 further comprising means for driving said actuated means in one direction of rotation, said driving means including a motor, a worm and gear drive means operably driven by said motor, and a jack shaft driven by said worm and gear drive means, said connecting means including linkage assembly means operatively connected between said rotatable actuating means and said oscillating journaled mechanism, said rotatable actuating means including a pivot wheel continuously rotated in one direction by said motor through said jack shaft, and an offset pin carried by said pivot wheel and located at a predetermined radius of said pivot wheel for pivotally supporting said linkage assembly means for continuously oscillating said oscillating journaled mechanism means.

4. The combination defined by claim 1 further comprising a motor, a worm and gear drive, said rotatable actuating means including a jack shaft driven continuously in one direction by said motor through said worm and gear drive, said connecting means including a first pair of offset pivot wheels driven by said jack shaft in continuous rotation in one direction, each of said first offset pivot wheels including an offset pin connected to said pivot wheel at a predetermined radius from a center of rotation of said pivot wheel, and a link connected at one end to said pin, a second pair of offset pivot wheels, each of said second pair of offset pivot wheels including a second offset pin operatively connecting one of said links at its other end to one of said second offset pivot wheels, said second pair of offset pivot wheels being connected to said oscillating jouraled mechanism means for operably oscillating the intermediate race of each of said bearings at an exact same time of actuation in one direction as in the other direction and for an exact same distance of travel in said opposite directions.

5. The combination defined by claim 1 in which said rotatable actuating means includes a common shaft, an offset portion at each end of said shaft extending transversely to said shaft at 180 degrees opposite to each other and at a predetermined radial distance from an axis of said shaft, means supporting each intermediate race of each bearing at a transverse location and at a radial distance from the axis of oscillation of the oscillating journaled mechanism means in excess of the predetermined radial distance, motor means to rotate said shaft, and means for connecting the offset portions of each end of said shaft with said journaled mechanism means so as to thereby continuously oscillate said intermediate race by said journaled mechanism means in the opposite directions and over said equal angular ranges.

6. The combination defined by claim 1 including means for driving said actuating means in one direction of rotation, said driving means including a motor, a worm and gear drive operably driven by said motor and a jack shaft connecting said worm and gear drive rotating in one direction and wherein said rotatable actuating means includes a pair of pivot wheels connected to said shaft for continuous rotation in one direction, an offset pin connected to each of said pivot wheels at a predetermined distance from a center of rotation of said pivot wheels and at an exactly opposite phase to each other, said connecting means including a linkage pivotally connecting each of said pins and extending substantially in the plane of rotation, and said oscillating journaled mechanism means including a pair of second pivot wheels each having a pivot pin pivotally connecting said linkage and wherein said pivot pins of the second pivot wheels are located at a distance from a center of oscillation of the oscillating journaled mechanism means which is greater than the predetermined distance of the pins of said actuating means and at an angle to each other for the oscillation of said journaled mechanism means as said actuating means is continuously rotated in one direction.

7. The combination defined by claim 6 wherein each of said journaled mechanism means includes a gear interposed between each of the intermediate races and said second pivot wheels, said gear meshing with each of said second pivot wheels for oscillating each of said intermediate races within the bearings.

8. The combination defined by claim 6 wherein each of said journaled mechanism means includes a gear meshing with each of said second pivot wheels and oscillated thereby for producing the oscillating action within the intermediate races of each of said bearings, and a main gimbal frame supporting the bearings for operation of said intermediate races through said gears and said pivot wheels.

9. The combination defined by claim 6 wherein each of said journaled mechanism means includes a gear meshing with each of said second pivot wheels and oscillated thereby for producing the oscillating action of the intermediate races within said bearings and wherein each of said gears are integral to each of said intermediate races.

10. The combination defined by claim 1 wherein each bearing includes outer and inner races and wherein each of said journaled mechanism means is operably connected for producing the oscillating action of the intermediate races within said outer and inner races, and further comprising an inner gimbal shaft connecting the inner races of said bearings, a main frame gimbal connecting the outer races of said bearings, and the means connecting the rotatable actuating means to the journaled mechanism means including linkage assembly means interposed between said oscillating journaled mechanism means and said rotatable actuating means, said actuating means including first pivotal connecting means for connecting said linkage assembly means at a predetermined offset distance from a center of rotation of said rotatable actuating means, and said oscillating journaled mechanism means including second pivotal connecting means connecting said linkage assembly means at an offset distance from a center of oscillation of said oscillating journaled mechanism means which is greater than the predetermined offset distance of said first pivotal connecting means for producing a continuous oscillating motion at exact and equal displacement over an angular range of less than 180 degrees and more than 90 degrees and at an equal period of oscillation as said actuating means is continuously rotated in one direction.

11. In a friction minimizing means of a type including a pair of opposed bearings for supporting a gimbal of a gyroscope along an axis of the gimbal, each of said pair of opposed bearings including an intermediate race, and means for oscillating each of the intermediate races of said pair of opposed bearings; the improvement comprising a unidirectional driving means, bicyclic operating means connecting said unidirectional driving means in opposite senses to the oscillating means for the intermediate races of both of said pair of opposed bearings so as to angularly oscillate said intermediate races in opposite senses over an equal angular displacement range of less than 180 degrees and more than 90 degrees, said bicyclic operating means causing the oscillating means to angularly oscillate one of said intermediate races in one direction and to angularly oscillate the other of said intermediate races in an opposite direction over said equal angular displacement range during one cycle of operation, and said bicyclic operating means causing the oscillating means to angularly oscillate the intermediate races in a reverse opposite direction relative one to the other over said equal angular displacement range during another cycle of operation, and said cycles of operation being alternately effected by said bicyclic operating means at equal periods of oscillation and over said equal angular displacement range of oscillation so as to cause bearing friction introduced in the opposed bearings by the angular oscillation of one of said intermediate races in one direction about the gimbal axis to be effectively canceled by an equal and opposite bearing friction introduced by the angular oscillation of the other of the intermediate races about the gimbal axis in an opposite direction so as to minimize frictional forces acting about the gimbal axis.

12. The improvement defined by claim 11 in which the equal angular displacement range of oscillation of the pair of the intermediate races effected by the bicyclic operating means is a range of substantially 107 degrees.

References Cited

UNITED STATES PATENTS

| | | | |
|---|---|---|---|
| 841,612 | 1/1907 | Anschutz-Kaempfe | 74—5 |
| 2,970,480 | 2/1961 | Zeigler et al. | 74—5 |
| 2,410,602 | 11/1946 | Davis. | |
| 2,577,942 | 12/1951 | Agins. | |
| 2,973,649 | 3/1961 | Zeigler et al. | |
| 3,082,629 | 3/1963 | Jones et al. | |
| 3,131,568 | 5/1964 | Garwood. | |
| 3,225,606 | 12/1965 | Stiles. | |

FRED C. MATTERN, JR., *Primary Examiner.*

F. D. SHOEMAKER, *Assistant Examiner.*